(12) United States Patent
Ruzicka

(10) Patent No.: US 6,837,770 B2
(45) Date of Patent: Jan. 4, 2005

(54) TREATMENT FLUID DISPENSER FOR CONTROL OF MITES

(76) Inventor: Vaclav Ruzicka, 2910 Glenmore Road N., Kelowna, British Columbia (CA), V1V 2B6

( * ) Notice: Subject to any disclaimer, the term of this patent is extended or adjusted under 35 U.S.C. 154(b) by 0 days.

(21) Appl. No.: 10/410,199

(22) Filed: Apr. 10, 2003

(65) Prior Publication Data
US 2004/0229542 A1 Nov. 18, 2004

Related U.S. Application Data

(63) Continuation-in-part of application No. PCT/CA01/01434, filed on Oct. 12, 2001.

(30) Foreign Application Priority Data

Oct. 13, 2000 (CA) .............................................. 2323263

(51) Int. Cl.[7] .............................................. A01K 47/06

(52) U.S. Cl. .............................................. 449/2; 449/3

(58) Field of Search ............................ 449/1, 2, 3, 20, 449/22; 43/125, 131; 425/305.5

(56) References Cited

U.S. PATENT DOCUMENTS

| | | | |
|---|---|---|---|
| 2,956,366 A | * 10/1960 | Wiesman | ..................... 43/131 |
| 3,620,453 A | 11/1971 | Gancberg et al. | |
| 4,614,299 A | 9/1986 | Van Loveren et al. | |
| 4,663,226 A | * 5/1987 | Vajs et al. | ............. 428/305.05 |
| 4,824,719 A | * 4/1989 | Creyf et al. | ................. 442/372 |
| 4,965,287 A | * 10/1990 | Stendel et al. | .............. 514/531 |
| 5,575,139 A | * 11/1996 | Green | ........................... 54/66 |
| 6,090,479 A | * 7/2000 | Shirato et al. | ........... 428/304.4 |
| 6,343,433 B1 | 2/2002 | Granberg | |
| 6,472,442 B1 | * 10/2002 | Masubuchi | .................. 521/51 |

FOREIGN PATENT DOCUMENTS

| | | |
|---|---|---|
| DE | 196 36 498 A1 | 3/1998 |
| WO | WO 97/32470 A | 9/1997 |

* cited by examiner

*Primary Examiner*—Robert P. Swiatek
(74) *Attorney, Agent, or Firm*—Antony C. Edwards

(57) ABSTRACT

A treatment fluid dispenser pad includes a phenolic foam core encased in a fluid impervious skin or sheath. The fluid impervious skin or sheath is sealed about the phenolic foam core. The pad is cut in one or more sections and soaked in formic acid fluid. Each section of pad is vertically hung in a bee space so as to downwardly dispose an exposed surface of the phenolic foam core to thereby evaporate acid at a uniform rate.

29 Claims, 3 Drawing Sheets

TREATMENT FLUID DISPENSER FOR CONTROL OF MITES

CROSS REFERENCE TO RELATED APPLICATION

This application is a Continuation-In-Part of International Application No. PCT/CA01/01434, entitled Treatment Fluid Dispenser for Control of Mites, with an International filing date of Oct. 12, 2001, which was published under PCT Article 21(2) on Apr. 13, 2002 under International Publication Number WO 02/30181 A1 and which claims priority from Canadian Patent Application No. 2,323,263 filed Oct. 13, 2000.

FIELD OF THE INVENTION

This invention relates to the field of methods for treating bees, for example controlling mites and in particular trachea and varroa mites.

BACKGROUND OF THE INVENTION

It is well known to control trachea and varroa mites in a beehive by release of formic acid by evaporation at a controlled rate so as to achieve a concentration of acid fumes just below that of being harmful to the bees. In the prior art applicant is aware of German Patent No. 3427330 to Kramer. Kramer discloses a device for combating varroa mites in beehives where the device consists of soft fibre plates impregnated with formic acid and enclosed in a perforated plastic bag. In particular, the Kramer device consists of a 250–650 square centimeter soft fibre plate having 10 millimeters thickness which may be impregnated with 200–300 millilitres of concentrated formic acid. The soft fibre plate may be enclosed in a plastic film bag having 5–15 perforations on each side of the plate for a total exit area of 15–55 square centimeters.

Kramer teaches that, when placed horizontally in the hive over the brood area and above the brood chambers of the bee population, that the soft fibre plate formic acid dispenser controls varroa mites without harming the bees. The size of the fibre of plate and extent of the perforation of the plastic bag result in controlled release of 85% formic acid concentration over a period of 7 days in August and 14 days in October.

There are many different ways of dispensing acid. They require multiple applications, or several adjustments to openings or cutting slots. They work on the principle of absorbency and evaporation by regulating the wrap openings. Generally, these dispensers are placed on the top of the cluster or on the bottom board. They may or may not work equally on colonies of different sizes. They also require additional space and equipment.

As reported in the American Bee Journal (March, 1996, at pages 190–192), the Kramer soft fibre plates are made of Pavatex™ and the plastic bags are of 0.15 millimeter thickness. For storage the plates are kept frozen and the plastic container kept air tight. Before application, the necessary evaporation holes are made in the plastic casing with a round punching tool of 1.5 centimeters diameter. The number of holes varies according to the hive system and climate including the microclimate of the apiary. For a treatment, the plates are hung into the empty honey chamber by means of a honeycomb frame for seven days. For medium sized one story hives, Kramer teaches that a distance of 5 centimeters should be kept between the brood combs and the board.

The treatment efficiency of this method depends on the formic acid concentration in the hive air and on the duration of the treatment. It can be controlled on the basis of the amount of evaporated formic acid. Thus, the board has to be weighed before and after the treatment. If there is an evaporation of more than 7 grams of formic acid (85% concentration) per day, a treatment efficiency of more than 95% may be expected. If less than 7 grams evaporate, the treatment efficiency will be insufficient. To be reused, the Kramer plates must be reimpregnated with formic acid up to their gross weight of 250 grams of formic acid.

Acid is sold at an 85% concentration. At this concentration, acid evaporates faster introducing acid at a damaging rate exceeding the bees' ability to ventilate and causing losses of young and old queens as well as brood. At 73%, formic acid and water evaporate equally at the evaporating surface. At 65% water evaporates faster. Evaporation of water at the evaporating surface creates a gentle introduction of acid into the hive and eliminates young queen losses and brood mortality.

SUMMARY OF THE INVENTION

The treatment fluid dispenser (hereinafter alternatively referred to as a "pad") of the present invention includes a phenolic foam core snugly encased in a fluid impervious skin or sheath. The core is advantageously a planar member, for example, a rectangular plate. The fluid impervious skin or sheath is sealed about the phenolic foam core. The phenolic foam core has a great many elongated cells connected and resulting and performing like capillary tubes longitudinally extending along the core. When it is desired to dispense formic acid or other treatment fluid from the phenolic foam core the fluid impervious skin and phenolic foam core is sliced transversely (i.e., across the cell structure), for example so as to separate the dispenser into two half sections or halves, alternatively referred to as half-pads. Each section or half is soaked in formic acid (advantageously 65% concentration) or other treatment fluid and hung vertically in a bee space so as to downwardly dispose an exposed surface of the phenolic foam core, to thereby evaporate acid at a uniform rate. The present invention works on the principles of the capillary tube and gravity. When soaked with, for example, acid, a 7–8 gram phenolic foam core will absorb approximately 230–240 grams of acid. Hung vertically, the cell structure will keep the liquid in the core without dripping after initial installation and gravity will pull down the fluid to replace evaporated fluid. Under controlled conditions of 24 degrees Celsius (74 degrees Fahrenheit) and 55% humidity, $\frac{3}{8} \times 4$ inches (10 mm×100 mm) evaporating surface will emit approximately six grams of acid a day.

The treatment of the present invention is adaptable to most weather conditions, hive sizes and beekeeping management practices. The number of pads and width of evaporating surface will determine the daily lethal dose delivered to kill varoa and tracheal mites in hives. The evaporating surface can be reduced by taping so as to reduce the evaporation rate to a desired dosage. The length of the pads determines the length of treatment from 21 to 80 days. Each millimetre of length of a 3 $\frac{1}{8} \times 4$ inch pad contains 1 gram of acid, each ¼ inches, 6 grams of acid, each 1 inch approximately 25 grams of acid. Simple tests and instructions lead the beekeepers to adapt the present method to their own circumstances, by using, for example, ¼ or ⅓ or ½ or the whole length of a pad. According to local evaporation rate conditions in a standard treatment of 21 days, two ½ pads are generally used. For colonies of 30,000 bees, 10 frames of bees 3–4 frames of brood. Housed in two standard Langstroth hives, a standard treatment as set out below may be appropriate.

Another key to the success of the present invention is its mounting location inside of the hive. The pads of the present invention are ⅜ of an inch (10 mm) thick. Pads are placed in available bee space between the last comb and the side wall of the hive. In this location, in applicant's experience, the bees in 95% of hives will leave the pads alone and maintain favourable temperature and humidity.

In summary, the treatment fluid dispenser for fluid treatment of bees according to the present invention includes a foam core having capillary cell structure and a fluid impervious skin mounted on and around the core. In one embodiment, the skin completely encloses the core awaiting sectioning. In such an embodiment the skin and the core are sectionable, for example by manual slicing by a knife, for exposing a cross-sectional surface of the core. This exposes ends of capillaries of the capillary cell structure to thereby provide a treatment fluid absorbing and evaporation surface. The core may then be used as a non-dripping fluid reservoir for the treatment fluid.

The core may have a length greater than its width and may be generally plate-shaped or planar, parallelepiped or a rectangular parallelepiped. Each core has a thickness, a width and a length. The thickness is generally equal to a corresponding dimension of a bee-space in a hive. The length may be greater than twice the width so that, when bisected transversely of its longitudinal length by the cross-sectional surface bisecting transversely across the core so as to form two half sections, the half sections each are longer than they are wide, each half section having the cross-sectional surface at one end of its length.

The core of a pad is sized to store approximately 230–240 grams of formic acid or other treatment fluid, or approximately 115–120 grams in each half of the core once the core has been cut generally in half to form the evaporation surfaces on two of the cross-sectional surfaces thereby formed. In the case of formic acid, the evaporation surfaces on each half of the pad are advantageously sized so as to release by evaporation approximately 6 grams of formic acid per day per each pad evaporating surface of ⅜×4 inches when the half pad has been soaked in formic acid and hung inverted in a bee space in a hive with the evaporation surface of the half pad disposed downwardly of the body of the half pad.

The method of the present invention includes the steps of:
(a) forming a sectioned pad segment by sectioning the pad so as to expose the cross-sectional surface of the core,
(b) soaking the sectioned pad segment in formic acid or other treatment fluid so as to substantially fill the capillary cell structure, and
(c) hanging the pad segment filled with the treatment fluid in a bee space between an outside comb and a side wall of the hive, so as to downwardly dispose the cross-sectional surface in the bee space.

The sectioning of the core may be done by slicing by a knife perpendicularly across the core and the skin so as to bisect the pad halfway along its length. The step of soaking the sectioned pad segment may include soaking the sectioned pad segment in 65% concentration formic acid.

In an alternative embodiment according to the present invention, the fluid dispensing pads may be put on the top frame of the hive, horizontally. Other types of liquid treatment fluids may be used including for example Uddersept™ wash.

DETAILED DESCRIPTION OF EMBODIMENTS OF THE INVENTION

A drawback of the prior art Kramer device is introduced by the reduced absorbency of the soft fibre Pavatex plates as compared to the phenolic foam core pad of the present invention. A further drawback is the use of a high (85%) acid concentration which may cause the loss of queen bees. The reduced absorbency means that a Kramer device is more bulky, in that it requires 650 cc (up to 1100 cc for a two story hive) of Pavatex material, which cannot conventionally be placed in any existing space in the hive, and additional box space is required. That is, 2 ½ times as much material (five times as much material in the case of a two story hive) is required as compared to the formic acid dispenser pad of the present invention which is placed in existing bee space in any standard Langstroth hive. For a standard treatment, the present invention uses one half pad in one standard deep Langstroth box, and two half pads for a colony that is two boxes high. More pads and/or of different lengths are required in non-standard conditions.

In the description as follows it is understood that the example given of formic acid is by way of illustration only and is not intended to be limiting, that is, the treatment fluid does not have to be formic acid. It may be other e.g. lactic, oxalic, citric acids or menthol liquid dissolved in water or alcohol or other treatment liquids may be used. It is possible to use other concentrations also, other than those specifically taught herein. Thus the present invention is intended for use with any fluid treatment that may be applied to a hive by metered evaporation of the fluid.

The treatment fluid dispenser of the present invention replaces the soft fiber plates taught in the prior art by Kramer with a phenolic foam core, for example of the type used to retain water in the base of floral presentations. One type of phenolic foam which has been successfully employed, is Standard Oasis™ Floral Foam, manufactured by Smidher Oasis, International. It has been found that phenolic foam is highly absorbent of, and not affected by, formic acid. The phenolic foam cell structure provides a capillary action that results in a relatively constant evaporation rate given constant temperature and humidity, whereas the soft fibre Pavatex plates of the Kramer device are made of material such as employed in ceiling tiles or peg boards, that is, out of textile waste, and, it has been found, the absorbency is inconsistent.

Figure 1:
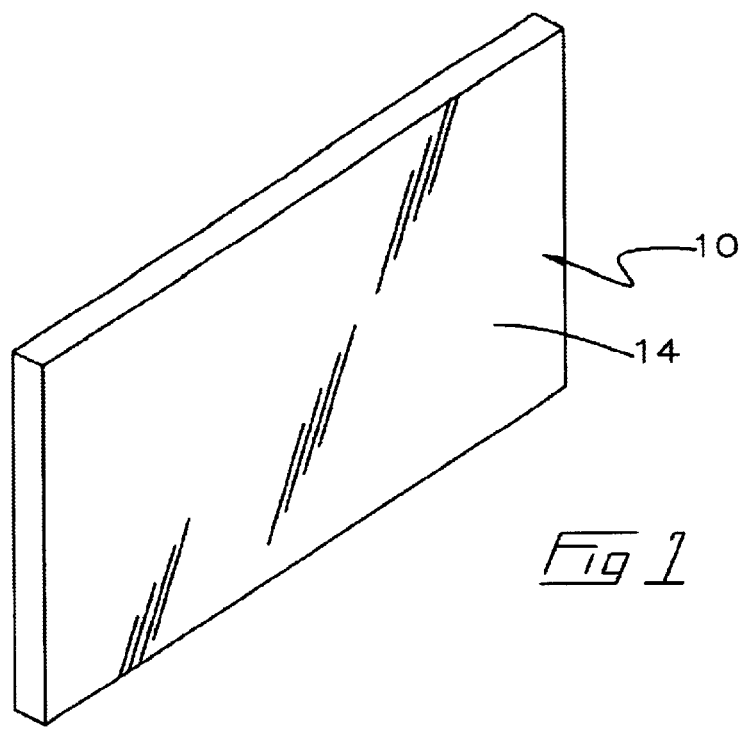
FIG. 1 is, in perspective view, the treatment fluid dispenser of the present invention.
Figure 2:
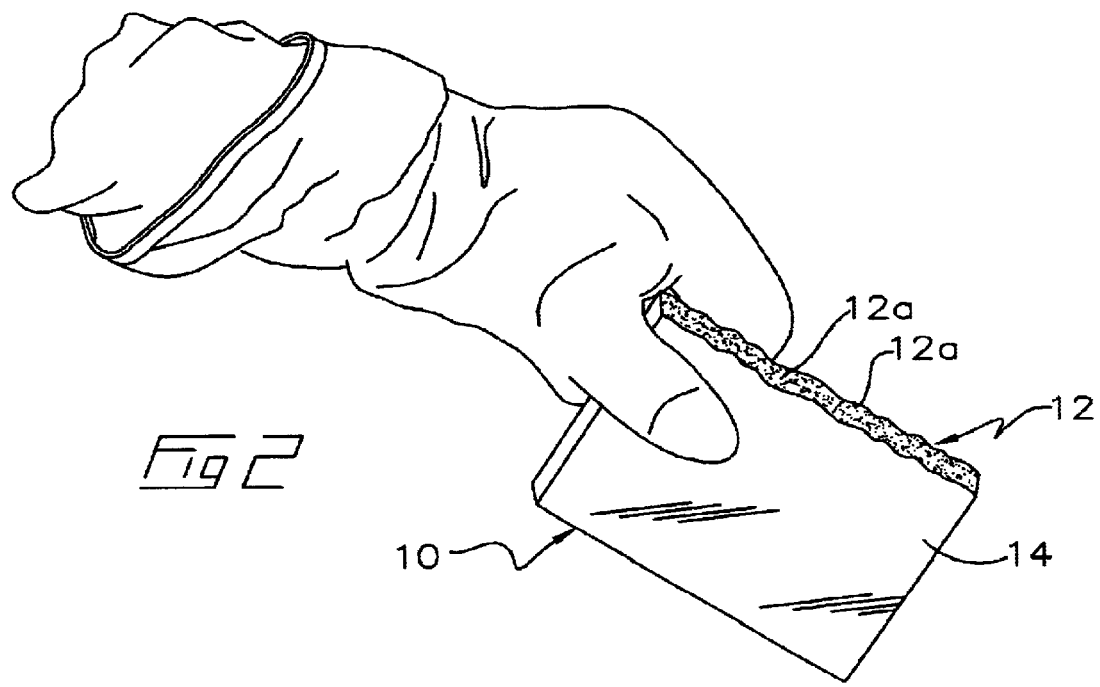
FIG. 2 is, in perspective view, a user holding a half-pad.

As seen in FIG. 1 and in cross-section in FIG. 2, the formic acid dispenser pad 10 of the present invention in one embodiment is an approximately 225 cubic centimetres phenolic foam core 12 which, it has been found, will absorb approximately 230–240 grams of formic acid (65% concentration). A typical pad thickness is equivalent to a bee space, for example approximately 9.5 millimeters (⅜ of an inch). The phenolic foam acts as a formic acid reservoir holding the formic acid within the capillary cell structure 12a of the foam. The foam core is sufficiently rigid to allow a fluid impervious skin 14 to be snugly mounted on the foam core, so as to enclose the foam core. Skin 14 may be a plastic film or the like. Mounting of the skin on the foam core may be by shrink-wrapping, dipping, or by like means known in the art. Sealed pads are shipped for resale, empty for fill up by an applicator, franchise dealer or final user beekeeper himself, as formic acid is readily available commercially.

85% concentration acid may be thinned to 65% using water, either by weight or by volume, as it makes little difference. The concentration of formic acid may be varied so that, herein, reference to 65% concentration formic acid is to be taken to mean concentration in the range of between 50–90%, although, a beekeeper may prefer to initially use 65% for testing of a particular hive according to the testing procedure below.

In use in a standard treatment which is not intended to be limiting but rather by way of example, the fluid impervious skin of the pads, which maybe formed as flat plates, are cut into sections in standard treatment into half-pads 10a to allow soaking in acid and hanging to release the formic acid by evaporation. The cut pad may be 4"×5" in plainform dimension. In use a half-pad is hung vertically for example by use of a nail or toothpick or staple to the comb, for example a typical comb measuring 10"×18". The cut half-pad is mounted in the hive bee space so as to dispose the exposed cut surface 16 downwardly in a bee space between an outside comb and a side wall of the hive. A so-called outside comb is "outside" in the sense that, in the array of parallel closely adjacent combs in the hive, it is on the end of the array. In the present disclosure a bee space is defined as an empty space required and maintained by bees between two combs in a hive or between an outside comb and a hive side wall, in which the bees manoeuver and live.

In use, the formic acid dispenser of the present invention releases approximately 6 grams of 65% formic acid per day. In a small hive, the rate of evaporation may be reduced by physically reducing the size of the evaporation surface. This may be done for example by masking the evaporation surface using tape.

In a standard 21 day treatment (3 brood cycles of varoa mite) a single half pad 10a may be used for a single story hive. Both halves of a pad, that is two half-pads may be used for a two story hive. The beekeeper must take care not to overfill the pad with formic acid otherwise during the first day of treatment an overly high concentration will be released. Therefore, it is advantageous to merely, for example, ¾ fill the pad to avoid blasting the hive during initial treatment.

Figure 3:
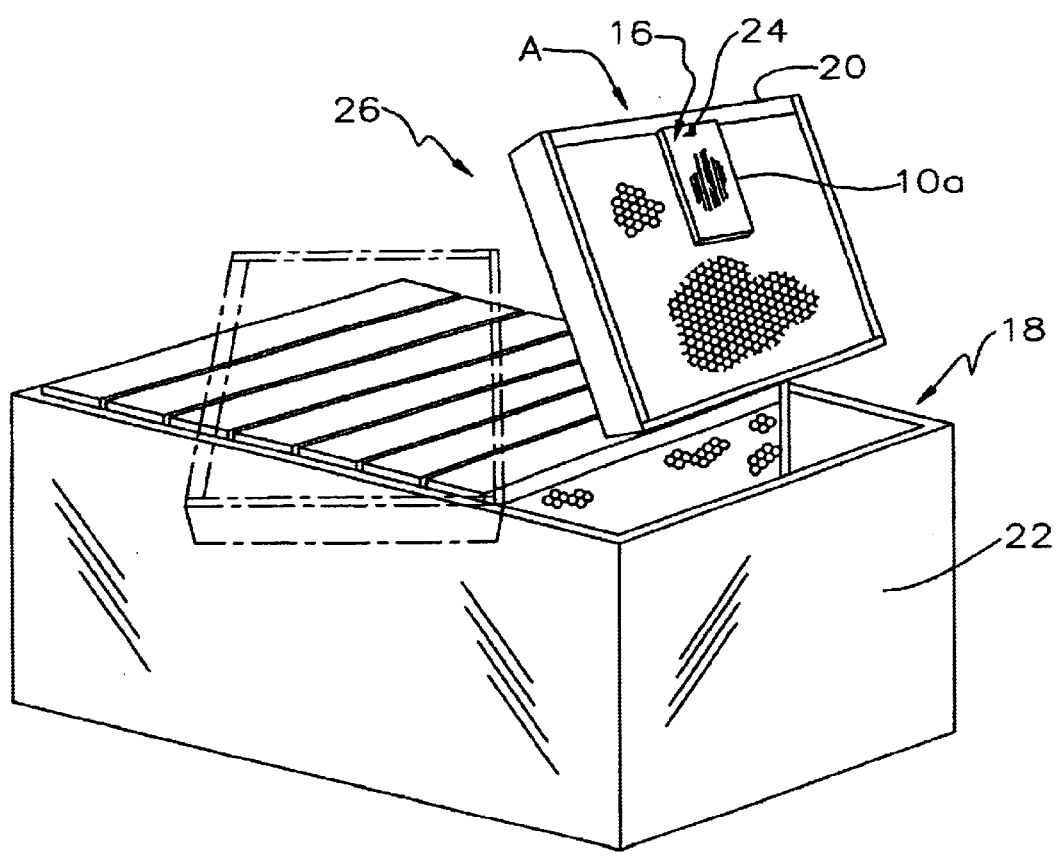
FIG. 3 is, in perspective view, a comb having a pad mounted thereon being inserted into a bee space between an outside comb and a side wall in a hive.

In a typical instalment, where pads may be of various lengths, each pad 10a is hung with its exposed phenolic foam surface 16 disposed downwardly in bee space 18 between the outside comb 20 in the hive and the side wall 22 of the hive. The pad may for example be secured by fastener 24 to the top bar of the frame of comb 20. As seen in FIG. 3, comb 20 has been removed from the open hive 26 (once the adjacent comb has first been removed), a pad fastened to the top of comb 20 so that the pad hangs downwardly with exposed surface 16 downwardly disposed in bee space 18 once comb 20 has been re-inserted into the hive in direction A so as to be adjacent side wall 22. For installation, a user takes two combs out of the top box and lays them on the top of the combs remaining in the hive. The inside side wall of the hive body is cleaned. Pads, once cut and soaked in acid are mounted directly on the comb just taken out of the hive. The pad is stapled, nailed or pinned to the comb or frame top bar of the comb so that the exposed surface will be downward facing. The comb with the pad or pads attached to it are put back into the hive body with the pad or pads against the side wall. The other comb is put back into the hive. The pads are taken out after 24 days. If desired, the pads may be cleaned and then may be pinned to any sheltered wall to dry and then the evaporating surface re-cut to provide a re-finished surface for re-use, pads may be stored in layers divided by wax paper.

Using a 65% concentration of acid reduces the initial impact of the acid fumes on the bees, making it more acceptable to the bees and queen losses rare. The concentration of acid fumes should be just below the level causing damage to adult bees. At this level, bees will increase ventilation, a roaring sound may be heard, and bees may climb out of the hive; however, applicant has observed they will settle down in 15–20 minutes. Small mortality or damage to new drones and freshly emerged bees are signs of this concentration level. These effects have been observed to be negligible during the spring treatment.

In cold climates, where four beehives maybe grouped together to form a rectangle, the fluid dispensers of the present invention are advantageously mounted toward the center of the rectangle where the temperature typically is warmer than the outside wall temperature, especially if the hives have been insulated. For example, it has been found that the bees will keep the temperature in the applicator space or bee space between the outside comb and the side wall in an insulated hive between 22–26 degrees Celsius (70–80 degrees Fahrenheit) and humidity around 55% when the temperature outside can be as low as 5 degrees Celsius, 42 degrees Fahrenheit, and humidity 90% or as high as 28 degrees Celsius, 83 degrees Fahrenheit and humidity 20%. At high temperature 25 degrees Celsius, 80 degrees Fahrenheit and humidity of 85% and more evaporation rate will drop to half. This is can be solved by using ¼ pads instead of ½ pads, doubling the evaporation surface.

A typical pad thickness is equivalent to a bee space already existing in a hive, for example approximately 9.5 millimeters (⅜ of an inch). In the Kramer prior art evaporation method (holes on the side of the plate), typically 20 millimeter spacer bars are placed under horizontally placed plates. This extra space requirement has been addressed by requiring extra boxes to mount the Kramer plates in. For a large farm having thousands of hives, this equates to installing corresponding thousands of extra boxes. Further, the procedure recommended by Kramer of freezing the plates, which it has been found is done to allow for easier cutting of holes into plastic covering of the soft fibre plates, requires in that instance freezer space for, perhaps, thousands of plates.

Further, in the Kramer method a template is used to place perforations in the correct locations. Where there are hundreds or thousands of plates to be perforated, having to make between 7 and 15 perforations through a template for each plate makes for an excessive amount of work. In the fluid dispenser of the present invention, the phenolic foam allows for ease of cutting without having to be frozen, and the plate may be merely cut in half and hung as described above, without the requirement for templated perforations. Pin-hole perforations made in the skin of a pad assists in quickly soaking up formic acid by pad.

In terms of case of shipping, an empty pad may be 4×10 inches in dimension, having a ⅜ inch thickness and weighing approximately 7–8 grams. The equivalent dispenser by Kramer weighs approximately 30–40 grams empty.

The system according to the present invention should be tested to determine or verify that it is retaining acid fumes, and also to determine the evaporation rate per pad or cut in a pad, and to determine the daily dose of acid required in each hive to reach a mite killing concentration of flumes, determined as set out below, thereby providing a sufficient mite killing treatment.

In one test, the hives were sitting in tall grass in a deep ravine; it was drizzling rain at 22° C. (72° F.) and 89% outside humidity. To my surprise inside the hive it was 23° C. (74° F.), and 83% humidity. For example, for use in high humidity atmospheric ambient conditions where applicant has found that the rate of evaporation per cut on a pad may drop by half, in order to obtain an evaporated daily dose rate which is effective to kill mites, the pad may be cut into 4 quarters so as to double the size of the evaporation surface thereby obtaining the same evaporated daily dose as would be obtained using two half pads at 24° C. (76° F.) and 55% humidity. However, this is jut one example. The inside humidity of the hive is affected by nectar or feed being evaporated, structure of the hives, and the hive's location. Hence the need to test to determine the actual evaporation rate per pad/cuts and daily dose, required to produce mite killing concentration of fumes, given a particular set of conditions including the particular ambient humidity. Further, in applicant's experience, testing and treatment must occur so that colonies are treated at least 21 days before the winter bees enter the caped stage. Again in applicant's experience, mite levels are kept low by using a third treatment during a drought period or during low honey flow periods.

Figure 4:
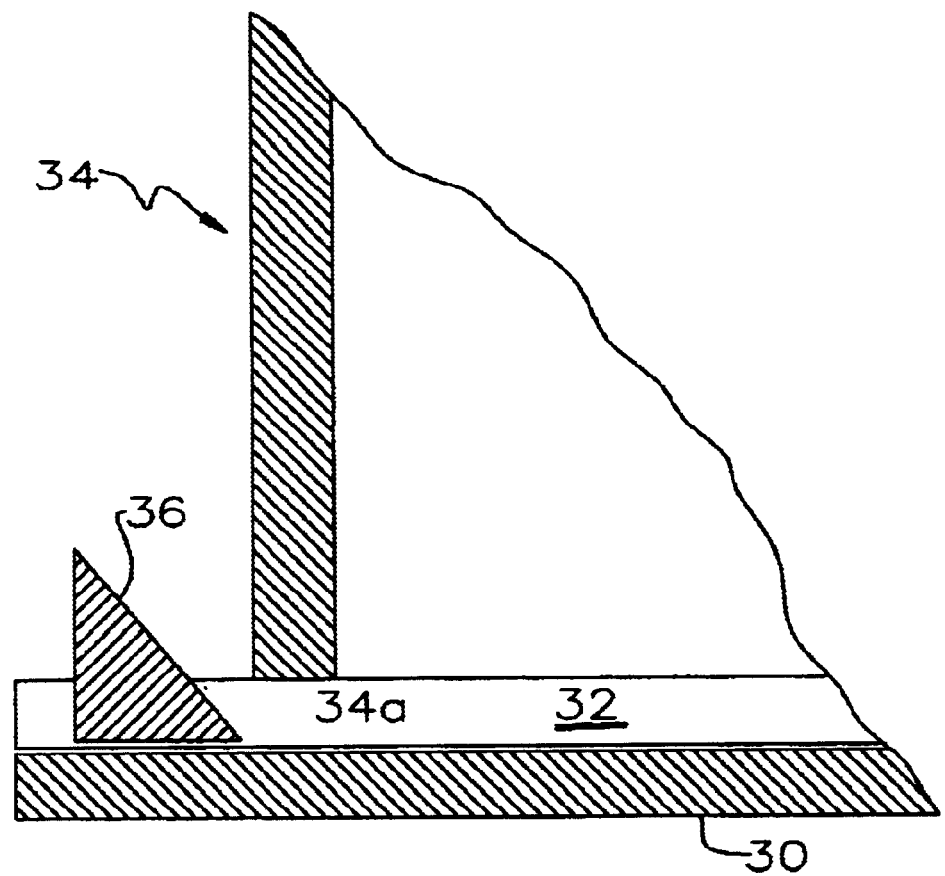
FIG. 4 is a sectional view of an entrance reducer used with a hive body.

For all evaporation treatments, the acid fumes must be retained inside the hive forming a pool of fumes at the entrance preventing the free flow of fumes out of the hive but still allowing ventilation. Retaining the fumes in the hive is vital when preparing the hives for a formic acid treatment. Acid fumes are heavier than air and will sink. It is important to trap fumes adjacent bottom board 30 so falling mites die in a pool 32 of fumes formed on top of the bottom board. This pool of fumes must also interfere with the bees' ventilation so the vapour is sucked back into the brood area or nest and bee cluster within the hive body 34. An entrance reducer such as the illustrated wedge-shaped block of wood 36 seen in FIG. 4 placed or mounted in front of the entrance 34a of the hive body, thereby forcing the bees to climb over the wedge-shaped block, helps create a tray which traps and holds pool 32 of acid fumes.

Sealing the hive, with the exception of the entrance, is also important. The screen bottom boards of the hive must be sealed off and top entrances and auger holes must be closed. Pieces of carpet or plastic placed under wood inner covers may be used to seal the top. Bees must be forced to ventilate through the pool of fumes trapped at the bottom entrance and mix the fumes with fresh air to create the mite killing concentration of fumes that circulate into the brood nest for effective treatment. Sheets of carpet or plastic may work to seal the top of the hive. Wooden inner covers under normal conditions are sealed by the bees with wax and propolis. However, with a formic acid application, the bees will not seal these gaps and use them for ventilation. Further, all auger holes, ventilation spaces, knotholes, and broken corners may create the same ventilation problems as gaps under a top cover. In applicant's experience it is therefore important to seal any openings with patches or fillers such as duct tape, mud, or Play Dough™. If these holes are not plugged, treatment may be in jeopardy or else a higher daily dose of acid into the hive will have to be employed.

Mites will not be killed unless a user reaches and delivers a mite killing concentration of acid fumes to the brood space of the hive, regardless of how long treatment continues. The daily dose referred to above is the amount of acid required to create the mite killing concentration of acid fumes. It is delivered by slow continuous evaporation over a period of 24 hours and will vary with the size and arrangement of the hive and also the size, strength, position of colony, brood nest, and ventilation of the hive. As stated, more space and more leaks in the hive will require more acid for each day. In testing, 6 grams of evaporated acid per box, 12 grams for 2 box high colonies, was established as a sufficient amount to treat hives in the Okanagan Valley of British Columbia, Canada. This may provide a starting point for a user, but it maybe quite different from what the user may need due to the above factors. Daily doses of from 6 to 18 grams of evaporated acid were tested with no damage to brood or bees. Sufficient treatment was obtained at 6 grams per hive box. In testing during mid-summer in a desert-like area where the temperature was 40° C. (106° F.) and 10% humidity, each half pad evaporated fully in 12 days actually delivering 24 grams a day with excellent treatment results and no losses of brood or queens. Applicant has observed that bees have a remarkable ability to compensate for an overdose of acid, up to a point. Through ventilation, bees can keep the concentration of acid fumes at the mite killing level, but below a level which would damage adult bees and brood.

In applicant's experience, a mite killing concentration of acid fumes will kill only 75–90% of the mites in each mite brood cycle. Although not wishing to be bound to any particular theory, in applicant's view it may be that the young mites are more resistant or the old mites go through several exposures between being protected in caped brood cells. There is no scientific knowledge or proof of which applicant is aware as to how formic acid kills the mites, but apparently the consensus is that a minimum treatment must be over 3 mite reproduction cycles, which equates to 3 bee cap (7 day) brood cycles, that is, 21 days. The higher the infestation, the longer treatment is required.

Contrary to other methods in the prior art, the dispenser according to the present invention allows for simple sizing of the daily dose. A beekeeper may design a treatment for 21 to 80 days by cutting the pads to various lengths and using one or more pads to deliver the mite killing concentration of fumes according to the local conditions and corresponding acid evaporation rate. Moreover, trimming so as to open the top sealed end of the pad (trim cut 1–2 mm, $\frac{1}{16}$") has been found to increase the evaporation rate by 10–25%. If for some reason a user must use a pad which is shorter than half the original length of the pad, then the tops of all pieces must be trimmed off so the tops and bottoms of capillary tubes are all equally open.

When testing the daily dose in applicant's experience a user should always choose weather of the highest ambient humidity at temperatures closest to 24° C. (76° F.) at the time of planned treatment This will result in the lowest evaporation rate. This rate is used to calculate the appropriate treatment.

Keep in mind that mixing 1 part water with 3 parts of 85% acid will produce 65% acid, and that it is much safer to do the thinning by weight at ground level rather than by volume at eye level.

One method to test the acid evaporation rate per cut per pad is to, first, prepare six hives for treatment. Then cut six pads in half Trim six of the pad halves at the top and leave the other six sealed at the top. Number each half pad. Soak each half pad in formic acid to obtain a ¾ full pad that contains a minimum of 60 grams, but no more than a maximum of 80 grams of stored acid. Dry the outer surfaces of the pads with paper towel, that is, on all surfaces including the surfaces of the evaporating cuts. Number and weigh the pads on an accurate, for example resolution, 1 g electronic scale. Record the weight, date, and time when the pads are placed in the hives. Install the one trimmed and one sealed pad into each of the six hives. After 4 to 6 days remove the pads and weigh them. Subtract the new lesser weight from the original weight and divide this evaporated amount by the number of hours the pads were in the hives then multiply that number by 24 to get a daily evaporation rate. Average the daily evaporation rate for the six trimmed and six sealed pads. This test gives the user an average evaporation rate per cut for both trimmed and sealed top pads.

Keep in mind that pads are always placed in the top box if there is more than one box, and between the comb and wall of the hive body, making sure the wall is cleaned from wax and debris. If two hives are next to each other put the pads against the adjoining walls. For individually standing colonies, place the pad against the wall facing down wind of the prevailing winds. On wood and wax frames, use half of a toothpick to pin the pads to the comb or staple the pad to the top of the frame without squashing the pads. On plastic frames, hang the pad from the frame for example using a paper clip unwrapped to form a hanger shape. Stapling, or pinning the pads to the wall of the hive body is another option. Do not squeeze, squash, or compress the pads.

The evaporating surface of each pad should have a clearance of ½" (12 mm) from any surface of the hive. The pads should not sit on other frames and on bottom boards.

If it is required to reduce the evaporation rate for smaller housings (nuks), smaller pads may be constructed by cutting the pads lengthwise to create a smaller, narrower pad, and then rewrapped. Alternatively, the evaporation surface may be partially sealed with sheathing tape to provide treatment for nuks of various sizes or reduction of the evaporating rate to produce a longer treatment.

Testing the daily dose required to reach a mite killing concentration of acid fumes may be described as having two steps. In the first step, once the evaporation rate is known, a user puts as many halves refilled to 80 g of acid into each test hive to reach the daily delivery of 6 grams of acid per box, or 12 grams for a 2 high colony. The user observes the hive for a loud "roar" from the bees. The next day the user looks for a few dead emerging bees and drones at the entrance and on the comb, and possibly some larva, or uses a drop test as described below. If the user does not see any signs of successful treatment, or if acid drops, as described below, are below five times the natural drop, the user increases the acid dosage until satisfied that the treatment has taken place and it is sufficient. This is the daily dose for the hive at the time of year of testing. These tests may be performed for treatments in at least spring and late summer. In the second step, now that the daily dose is known, the user also knows how many evaporating pads and width of cuts of pads were used to deliver the daily dose.

The length of the pad relates directly to the supply of acid and the length of treatment. As an approximation, every mm of length equates to one gram of acid and therefore every cm equates to 10 g of acid. In inches, every quarter inch equates to 6 grams of acid.

The required length of treatment is directly related to the level of mite infestation in a hive. For example, a 2 box high colony that requires a daily dose of 12 grams and that has a pad evaporation rate of 3 grams will need four quarter pads for a 21 day treatment, four half pads for a 40 day treatment, or four full pads for an 80 day treatment.

If the evaporation rate per cut is 6 grams per day, a half pad containing 126 grams will last 21 days. A fill pad cut to the depth of a comb (9–9 ⅜"), will last 40 days. A user may tape over half the evaporating surface to reduce the evaporation rate. Of course the humidity if high may already have reduced the evaporation rate by half to 3 grams a day. At 3 grams a day a quarter pad will last 21 days, a half pad 42 days, and a comb deep pad will last 80 days. The above is of course somewhat simplified, and the numbers rounded. Many combinations are going to suffice. The length of treatment within a few days of a recommended length of treatment is often sufficient. It is better to round up and deliver more acid for longer periods than less. For use with a varoa mite infestation, if treating with coumaphos or fluvalinate in the late summer, acid must be used in the spring to kill any fluvalinate resistant mites, even with a zero infestation rate. For use with a tracheal mite infestation, one 21-day treatment per year should suffice.

TABLE 1

| Natural Drop Count | Percent of Infestation in a Wash | Treatment in spring | Treatment in late summer |
| --- | --- | --- | --- |
| 0–8 | 2% | 21 day | 21 day |
| 8–15 | 2–4% | 21 day | 40 day |
| 15–30 | 4–6% | 40 day | 80 day |
| 30+ | 6%+ | 80 day | *80 day + 25% |

*Increase the daily dose by 25%

Verification testing should be done by the user. As stated above, tracheal mites may be kept below levels where they cause damage to colonies by using one 21 day prolonged formic acid treatment per year. A sample of 30 old forager bees maybe taken from each sampled hive used for slice testing. 50 randomly selected bees from the complete sample are sliced and searched for tracheal mites. If tracheal mites are not found farther testing maybe discontinued and no action is necessary. If mites are found, proceed with treatment. As varoa mites are becoming resistant to both fluvalinate and coumaphos it is advantageous for a user to test hives for resistance to these chemicals. If the hives test negative, fluvalinate may be used in August and formic acid in the spring. User should test 10% of hives in each yard with the minimum being 4 hives per yard.

Many known tests will indicate to a user that he has mites, but only the sticky boards, alcohol or soap wash tests provide a user with a count or percentage infestation which will then indicate the correct treatment selection. Wash tests have the advantage of only one trip to the bee yard, but a user will have to do a Petis test for resistance. Applicant prefers comparing drop counts on sticky boards.

A natural drop is a drop of naturally fallen adult mites collected for more than 3 days but not more than 5 days and then divided by the number of hours to give an average drop rate per 24 hours. A counting clicker and square counting pattern helps in counting. A user must in applicant's experience count all squares. Boards must be the full size of hives at least 12"×16" and placed at the center. When counting, a user should count only adult mites, which may be of any shade of brown, black or half black and white. A user should not count immature white or yellowish mites.

A Pesticide Drop is the drop induced by a chemical pesticide or acid. It is collected over 24 to 48 hours and the number of mites divided into a drop rate per 24 hours. All drops generally listed in prior art papers and literature are for colonies of 30,000, 10-frames bees including 2–4 frames brood unless otherwise stated. The drops are convertible into percentages used in wash tests. It is thus advantageous for a user to select hives of this strength for testing.

Resistance tests by natural drop compared to pesticide drop is a comparison test as an indicator of resistance build-up. In the late summer applicant does natural drop counts, then resets the boards and installs a pesticide treatment. After 2 days applicant counts the pesticide drop of mites. A pesticide drop of 20 times the natural drop is sufficient. A pesticide drop of merely 10 times may be insufficient, and a Petis test should be done. Below 10 times the natural drop, a pesticide treatment may not work and the user should use something else because of the bee's resistance to the pesticide. This does not apply to formic acid. An acid induced drop of 5 to 10 times the natural drop is a good treatment with formic acid.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A treatment fluid dispenser for treatment of bees in a bee hive comprising:
    a bee hive having a bee space between a hive wall and an adjacent comb,
    a foam core having capillary cell structure,
    a fluid impervious skin mounted on and around said core,
    said skin and said core sectionable for exposing a cross-sectional surface of said core so as to expose ends of capillaries of said capillary cell structure, to thereby provide a fluid absorbing pad and evaporation surface, wherein said fluid impervious skin is impervious to mite treatment fluid and wherein said dispenser is hung vertically in said bee space with said cross-sectional surface of said core exposed downwardly in said bee space whereby said core forms a non-dripping fluid reservoir for the mite treatment fluid when soaked into said core.

2. The dispenser of claim 1 wherein said core is phenolic foam and is generally plate-shaped and has a thickness, a width and a length, and wherein said thickness is generally equal to the bee space .

3. The dispenser of claim 2 wherein said length is greater than said width and said core is generally a parallelepiped shape.

4. The dispenser of claim 3 wherein said length is greater than twice said width so that, when bisected transversely of its longitudinal length by said cross-sectional surface bisecting trarversely across said core so as to form one or more sections, each said section has said cross-sectional surface at one or both ends of its length.

5. The dispenser of claim 1 wherein said core is sized to store approximately 240 grams of formic acid in a full length of said pad once said core has been cut generally in sections to form evaporation surfaces on said cross-sectional surfaces thereby formed.

6. The dispenser of claim 5 wherein said evaporation surfaces on said each pad are sized so as to release by evaporation approximately 6 grams of formic acid per day per pad when said pad has been soaked in formic acid and hung invested in said bee space with said evaporation surface of said pad disposed downwardly.

7. The dispenser of claim 1 wherein said pad is a plate.

8. The dispenser of claim 1 wherein said pad is planar.

9. The dispenser of claim 1 wherein said pad is generally a rectangular parallelepiped.

10. The dispenser of claim 1 wherein said skin and said core forming said pad are adapted to be manually sliced by a knife.

11. A method for killing varoa and tracheal mites in a mite infested bee hive comprising the steps of:
    (a) providing a fluid dispenser which includes a foam core having capillary cell structure, a fluid impervious skin mounted on and around said core, wherein said skin and said core form a pad and are sectionable for exposing a cross-sectional surface of said core so as to expose ends of capillaries of said capillary cell structure, to thereby provide a fluid absorbing pad and evaporation surface, wherein said core is thereby adapted to be used as a mite treatment fluid reservoir,
    (b) forming a sectioned pad segment by sectioning said pad so as to expose said cross-sectional surface of said core,
    (c) soaking said sectioned pad segment in mite treatment fluid so as to substantially fill said capillary cell structure,
    (d) hanging said pad segment filled with the mite treatment fluid in a bee space in a bee hive between an outside comb and a side wall of said hive so as to downwardly dispose and expose said cross-sectional surface in said bee space.

12. The method of claim 11 wherein said core is generally plate-shaped and has a thickness, a width and a length, the method further comprising the step of providing said thickness generally equal to a corresponding dimension of said bee-space.

13. The method of claim 12 further comprising the step of providing said length greater than said width and providing said pad as a generally parallelepiped shape.

14. The method of claim 13 further comprising the step of providing said length greater than twice said width and said sectioning comprising bisecting said core and said skin transversely of their longitudinal length by forming said cross-sectional surface so as to bisect transversely across said core to form one or more sections, whereby said sections and each said section has said cross-sectional surface at one or both ends of its length.

15. The method of claim 11 wherein said mite treatment fluid is formic acid, and wherein said method further comprises the step of cutting said pad generally in half to form a pair of half cores and to form said evaporation surfaces on two of said cross-sectional surfaces thereby formed, and providing said pad sized to store generally 120 grams of formic acid in each half of said pad of said pair of half cores.

16. The method of claim 11 wherein said fluid is formic acid and further comprising the step of sizing said cross sectional surface so as to release by evaporation in said bee space generally 6 grams of said formic acid per day per said cross sectional surface of $3/8 \times 4$ inches.

17. The method of claim 11 wherein sad sectioning of said pad is slicing by a knife perpendicularly across said pad and said skin so as to bisect said core into a desired section.

18. The method of claim 11 wherein said treatment fluid is formic acid and wherein said step of soaking said sectioned pad segment includes soaking said sectioned pad segment formic acid having a concentration range of between 50–90%.

19. The method of claim 11 further comprising the steps of testing said sectional pad segment to determine the quantity of said mite treatment fluid being evaporated per day into said hive and adjusting the size of said cross sectional so that said quantity substantially equals a required daily dose of said mite treatment fluid required to kill said mites without substantial damage to queens or brood within said hive.

20. The method of claim 19 further comprising the step of testing to determine said required daily dose.

21. The method of claim 20 further comprising the step of adjusting the continuous length of time said pad segment is hung in said bee space to obtain a required length of treatment time so as to substantially reduce an infestation of said mites in said hive, and adjusting the size of said pad segment so that sufficient said fluid is retained in said pad segment for administering said required daily dose over said required length of treatment time.

22. The method of claim 21 wherein said fluid is 65% formic acid and wherein said required daily dose is substantially 6 grams.

23. The method of claim 11 further comprising the steps of testing said sectional core segment to determine the evaporation rate of said mite treatment fluid being evaporated into said hive and adjusting the size of said cross sectional surface so that the quantity of said mite treatment fluid evaporated daily into said hive equals a required daily dose of said mite treatment fluid required to kill said mites without substantial damage to queens or brood within said hive.

24. The method of claim 23 further comprising the step of testing to determine said required daily dose.

25. The method of claim 24 further comprising the step of adjusting the continuous length of time said pad segment is hung in sad bee space to obtain a required length of treatment time so as to substantially reduce an infestation of said mites in said hive, and adjusting the size of said pad segment so that sufficient said fluid is retained in said core segment for administering said required daily dose over said required length of treatment time.

26. The method of claim 25 wherein said fluid is 65% formic acid and wherein said required daily dose is substantially 6 gram.

27. The method of claim 11 further comprising the step of forming in said hive a means to pool at the bottom of said hive fumes of said mite treatment fluid evaporated from said core segment.

28. The method of claim 27 further comprising the step of sealing said hive to make it substantially air-tight, leaving only the entrance for ventilation of said hive.

29. The method of claim 28 wherein said step of forming in said hive a means to pool said i at said bottom of said hive includes forming an upstanding blockage across an entrance to said hive extending across said bottom of said hive.

* * * * *